Sept. 30, 1952　　　　　E. H. LAND　　　　　2,612,450
SELF-FRAMING PHOTOGRAPHIC FILM UNIT CONTAINING A LIQUID, AND
PROCESS FOR PRODUCING FRAMED POSITITIVE IMAGES
Filed Jan. 17, 1946
FIG. 1
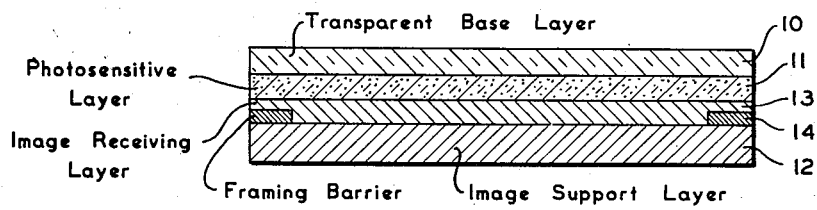
FIG. 2　　　　　FIG. 3
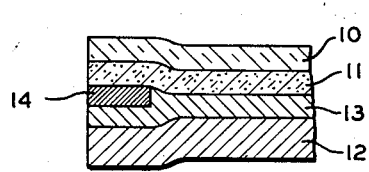 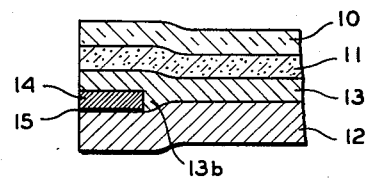
FIG. 4　　　　　FIG. 5
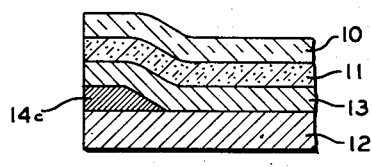 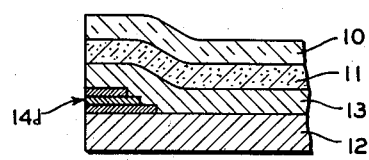
FIG. 6　　　　　FIG. 7
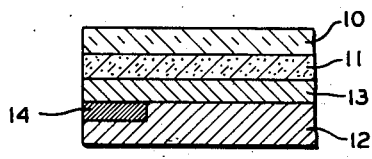 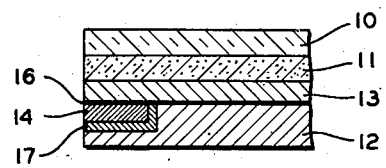
INVENTOR.
Edwin H. Land
BY Donald C. Brown
Attorney Patented Sept. 30, 1952

2,612,450

UNITED STATES PATENT OFFICE 2,612,450

SELF-FRAMING PHOTOGRAPHIC FILM UNIT CONTAINING A LIQUID, AND PROCESS FOR PRODUCING FRAMED POSITIVE IMAGES

Edwin H. Land, Cambridge, Mass., assignor to Polaroid Corporation, Cambridge, Mass., a corporation of Delaware Application January 17, 1946, Serial No. 641,809

16 Claims. (Cl. 95—8)

This invention relates to photography, and more particularly to novel composite photographic films and methods for utilizing such films.

One object of the present invention is to provide a novel composite photographic film which, during the course of exposure to actinic light, developing, and forming a positive image therein, will have formed around said positive image a frame for said positive image.

Another object is to provide a film of the above type which will produce a clear image having a well-defined framing border.

Still another object is to provide a novel photographic film wherein the frame for the final image is created wholly during the process of developing and forming the image, and the boundaries of the frame are defined without recourse to any special photographic techniques by the user of the film.

A still further object is to provide a novel process whereby a latent image is formed in a photosensitive film, said latent image being subsequently converted into a positive image of the subject matter of said latent image, with the formation of a frame for said positive image incident to the development and conversion thereof.

These and other objects of the invention will in part be obvious and will in part appear hereafter.

The invention accordingly comprises the product possessing the features, properties and the relation of components, and the process comprising the several steps and the relation of one or more of said steps with respect to each of the others, which are exemplified in the product and process hereinafter described, and the scope of the application of which will be indicated in the claims For a fuller understanding of the nature and object of the invention, reference should be had to the following detailed description taken in connection with the accompanying drawings wherein:

Fig. 1 is an exaggerated cross-sectional view of a photographic film embodying the present invention;

Fig. 2 is a partial sectional view of a photographic film showing another modification of the present invention shown in Fig. 1;

Fig. 3 is a partial sectional view of a photographic film showing a further modification of the invention described in Fig. 1;

Fig. 4 is a partial sectional view of a photographic film showing another modification of the invention shown in Fig. 1;

Fig. 5 is a fragmentary partial sectional view of a photographic film showing another modification of the invention shown in Fig. 4;

Fig. 6 is a partial sectonal view of a photographic film showing another modification of the invention shown in Figs. 4 and 5; and Fig. 7 is a partial sectional view of a photographic film showing another modification of the invention shown in Fig. 6.

In one form of the present invention, a photosensitive layer and an image support layer are provided. Between these two layers there is included a rupturable container or pod having therein a fluid, such for example as a liquid composition or reagent This composition is preferably viscous and preferably contains therein a developer and a film-forming material. The liquid composition also preferably contains a substance which will react with the unexposed portions of the photosensitive layer to form therewith soluble positive image-forming complexes. When the container is ruptured and the viscous liquid developing composition is spread between the photosensitive layer and the image support, such as by putting the assembly through a pair of pressure rollers, it will form an image-receiving layer. This layer is created by the action of the film-forming substance which, during the processing of the film, is converted from a fluid to a solid. The positive image-forming complexes are transferred from the photosensitive layer to the image-receiving layer, where the positive image is formed. There is thus produced a positive image of the subject matter of the latent image. In one preferred modification of the invention, the photosensitive layer may be stripped from the image-receiving layer to reveal the finished positive image.

Referring to Fig. 1, there is shown one form of composite film embodying the present invention. This film is similar to that described in my application Serial No. 578,379, filed February 17, 1945, for Photographic Products, which was abandoned in favor of my application Serial No. 64,870, filed December 11, 1948, for Photographic Product Comprising a Rupturable Container Carrying a Photographic Processing Liquid, now Patent No. 2,543,181, issued February 27, 1951. This is a preferred form of the invention, although the invention is not by any means limited to this particular type of film. This film is shown for clarity as it would appear after exposure and processing but prior to separation.

As shown in Fig 1, there is provided a transparent base layer 10 adapted to carry thereon a photosensitive layer 11. This base layer 10, in a preferred form of the invention, may be formed of a cellulosic film base material such as cellulose acetate, cellulose nitrate or cellulose acetate butyrate. The photosensitive layer is preferably of the type rendered developable by exposure to light, e. g. an emulsion of silver halide, or of a mixture of silver halides, or of a mixed silver halide. Below the photosensitive layer 11 there is provided a positive image support layer 12, which, in a preferred form, may be made of a relatively liquid-absorbent, liquid-permeable substance such as paper or a baryta paper. It may also be made of gelatin, regenerated cellulose, polyvinyl alcohol, polyhydroxy alkane, sodium alginate, certain of the cellulose ethers such as methyl cellulose, and their derivatives, such as sodium carboxymethyl cellulose or hydroxyethyl cellulose, carbohydrates such as gums or starch, and mixtures of these materials where the latter are compatible. It may also be made of an impermeable substance such as glass.

Since this invention comprises many of the features described in my above-mentioned copending application, it is apparent that the transparent base 10 may be replaced by an opaque base and that the support layer 12 may be either transparent or opaque, depending upon how the film is exposed and how it is handled within the camera.

In addition to the various layers of film recited above, there is also shown an image-receiving layer 13 which is formed during the developing process by the action of the film-forming substance contained in the liquid composition.

In the present process, the positive image is formed almost wholly within the image-receiving layer 13, but may also be on the surface of the image support layer 12. The present invention deals primarily with the formation of a frame around this positive image.

To accomplish this frame formation there is provided a framing barrier 14 which is cut to a shape corresponding to the frame desired on the final positive image. As shown in Fig. 1, this framing barrier is adjacent the positive image support layer 12. The framing barrier may be formed, among other things, of materials such as black interleaf paper, red cellulose acetate, baryta paper, tissue paper, cellulose acetate tape, water-proof cellophane, or a suitable vinyl plastic.

The operation of this embodiment of the invention as shown in Fig. 1 will now be described. The photosensitive layer 11 is exposed to actinic light and has formed therein a latent image. The viscous liquid developing composition is then squeezed between the photosensitive layer 11 and the positive image support layer 12 to form the image-receiving layer 13. It should be noted, however, that on the borders of the image, the image-receiving layer 13 is formed between the photosensitive layer 11 and the framing barrier 14. The framing barrier 14 has several possible functions, depending upon its material and that of the liquid composition which forms the receiving layer 13. It acts as a means to strip the borders of the image-receiving layer 13 from the positive image support layer 12. It can also act as an impermeable barrier to the fluids contained in the liquid composition so that the unexposed image cannot be transferred through this barrier to the positive image support layer 12. These unexposed image-forming complexes, which subsequently turn into the positive image, therefore remain in the image-receiving layer. This function could be performed with a framing barrier made of a substance such as water-proof cellophane. It is also possible that the framing barrier may constitute in itself a positive image-receiving layer and that an image can be formed thereon and therein. The image, however, in this case, does not permeate completely through the framing barrier. The positive image is in the image-receiving layer 13 and the framing barrier 14, but does not reach the positive image support layer 12. This effect has been noted when the framing barrier has been made of a substance such as blotter paper.

After the film has been completely developed and the image formed, the framing barrier 14, the photosensitive layer 11, and the base layer 10 are stripped from the positive image support layer 12, carrying therewith that portion of the image-receiving layer 13 which is between the photosensitive layer and the framing barrier. This leaves the positive image support layer with a clear, well-defined white border.

The invention embodied in Fig. 1 is not limited to the use of a viscous liquid developer composition containing a film-forming substance. A liquid non-film-forming developer composition can equally be used. In this case, the framing barrier is in contact with both the positive image support layer 12 and the photosensitive layer 11. The support layer 12 in this case acts as an image-receiving layer. The barrier acts either to prevent fluids in the liquid composition from reaching the borders of the photosensitive layer or prevents the unexposed positive image-forming complexes from transferring from the photosensitive layer to the positive image-receiving layer (12 in this case). If such be its function, the framing barrier is preferably formed of a material impermeable to the fluids in the liquid composition. It is equally possible that the framing barrier may allow said fluids to enter the borders of the photosensitive layer and to transfer the positive image-forming complexes to, but not through, the framing barrier. In this case the borders of the positive image are formed on and within the framing barrier, but not on or within that portion of the positive image-receiving layer 12 adjacent the barrier. With any of the functions described above, the framing barrier acts to perform the desired functions, that is, when the framing barrier is stripped from the positive image-receiving layer 12, there is left a clear, white border around the positive image on said layer.

In Fig. 2, like numbers correspond to like numbers in Fig. 1 and the framing barrier 14 is shown adjacent the photosensitive layer. In this modification of the invention, the framing barrier acts either to prevent the fluids in the liquid composition from permeating therethrough or prevents the transfer of the unexposed positive image-forming complexes from the photosensitive layer 11 to the image-receiving layer 13. Thus, there will be no image formed in the borders of the positive image and these borders will remain either white or the color of the image-receiving layer 13.

It is also possible to practice the invention of Fig. 2, wherein the lower surface of the barrier means 14 has a greater affinity for the image-receiving layer 13 than does the upper surface of the positive image support layer 12. This may be accomplished by forming on the lower surface of the barrier 14 a comparatively rough surface having interstices into which the liquid composition is adapted to flow during the film-forming process, thereby making a very tight bond between the border of the formed film of the image-receiving layer 13 and the barrier means 14. The borders of the positive image support layer 12 may be treated also, such as by calendering, to give a very smooth, slick surface which will not tend to create a good bond between the positive image support layer 12 and the formed film of the image-receiving layer 13. This feature of the invention may also be practiced by treating the above-mentioned surfaces by chemical means to obtain the same result, whereby the affinity of the barrier means 14 for the film in the image-receiving layer 13 is greater than is the affinity of the surface of the positive image support layer 12 for said film. In this modification of the invention, when the barrier means 14, along with the photosensitive layer 11 and the base layer 10, are stripped from the image-receiving layer 13 and the positive image support layer 12, the borders of the image-receiving layer 13 are removed along with the barrier means.

In order that there may be a clean severance of the border portion of the image-receiving layer 13 from the remainder of the image-receiving layer 13, it is preferable to make the remainder of the image-receiving layer have a greater affinity for the positive image support layer 12 than it has for the photosensitive layer 11. This may be accomplished by treating the positive image support layer 12 in that area within the boundaries of the border, such as by forming on its surface a number of interstices into which the image-receiving layer 13 may be formed to create a firm bond between the image-receiving layer 13 and the positive image support layer 12. If the photosensitive layer is a smooth gelatine, as is usually the case, the central portion of the image-receiving layer 13 is more tightly bound to the positive image support layer 12 than it is to the photosensitive layer 11 and there is a clean shearing of the image-receiving layer borders from the rest of the image-receiving layer 13.

In the modification of the invention described in Fig. 3, there is provided, in addition to the framing barrier 14, a seal 15, between the framing barrier and the positive image support layer 12. This seal is preferably used in those cases where the framing barrier does not form a good bond with the positive image support layer 12, such as is the case if cellophane is used as the framing barrier 14 and baryta paper is used as the positive image support layer 12. In the preferred modification, the seal 15 may be formed of an adhesive made of polyvinyl acetate or modified polyvinyl acetate resins such as that commercially available under the trade name "Vinylseal," which acts to bind the framing barrier 14 tightly to the positive image support layer 12, and also to prevent the liquid composition forming the image-receiving layer 13 from being extruded under the framing barrier when pressure is applied during the developing process described above. This has been found necessary in a number of instances, since, if this seal is not provided, the viscous liquid composition which works its way under the framing barrier will remain on the positive image support layer after the framing barrier 14 has been stripped from the positive image support layer 12. This has the disadvantage that the viscous image layer may have contained therein a certain amount of positive image-forming material which will give a discoloration to the frame.

As shown in Fig. 3, the transparent base layer 10, the photosensitive layer 11, and the image-receiving layer 13 are all relatively depressed by the action of the forming rolls through which this film is run during the development process. It is also possible that the positive image support layer 12 may be deformed in a similar manner depending upon whether it is made of glass or a flexible substance. The net result of this deformation is the collection of a pocket of the liquid composition forming the image-receiving layer 13 in the area 13b thereof. This pocket 13b, which extends completely around the positive image at the borders thereof, has the disadvantage that, due to the uneven flow of the material constituting the image-receiving layer 13b, the image formed therein will be somewhat fuzzy.

To remedy this defect, there are shown additional modifications of the invention, in Figs. 4 through 7. In these figures, like numbers correspond to like elements in Fig. 1. The purpose of these modifications is to eliminate the relatively thick pocket 13b of the liquid composition forming the image-receiving layer 13 immediately adjacent the edge of the positive image. As shown in Fig. 4, the framing barrier 14c is tapered inwardly from the outer edge thereof, to match the ability of the photosensitive layer to deform therewith; thus, as the film is run through the wringers during the development process, the image-receiving layer 13 is formed of a uniform thickness between the photosensitive layer 11, the positive image support layer 12, and the framing barrier 14c on the borders of the support layer.

In Fig. 4, there is shown only a one-sided taper. Actually, this framing barrier may be tapered on the bottom as well as on the top thereof.

Fig. 5 shows another modification of this idea, wherein the framing barrier 14d is built up of successive layers of decreasing size to form a pyramidal structure. In some cases this may prove to be a simpler method of accomplishing the same result.

In Fig. 6, there is shown another means for obtaining an image-receiving layer of uniform thickness by making the surface of the framing barrier 14 adjacent the photosensitive layer 11 flush with the surface of the positive image support layer 12. In this modification of the invention, the framing barrier may be either cast in the support layer 12, or the latter may be notched after manufacture and the framing barrier inserted therein. When the photosensitive layer and the framing barrier of Fig. 6 are stripped from the positive image support layer, they carry therewith the borders of the image-receiving layer 13. There is a slight ledge left on the positive image support layer 12. In view of the relative thinness of the various materials used in this photographic process, this ledge is not noticeable, and does not detract from the quality of the finished positive image.

In Fig. 7, there is shown another modification of the invention which will positively prevent any of the liquid composition forming the image-receiving layer 13 from being forced into the notched area of the positive image support layer. In Fig. 7 a coating 16, which is impervious to the liquid composition, is placed over the positive image support layer 12 and the barrier means 14. Thus, when the liquid composition is forced between the photosensitive layer 11 and the layer 16, it will remain between these two layers and will not seep between the barrier 14 and the positive image support layer 12.

There is also shown in Fig. 7 a means for obtaining a contrast between the whites in the positive image and the border. This comprises a layer 17 which is preferably cast or formed in the border notch of the positive image support layer 12 prior to the insertion of the barrier means 14 within said notch. Thus, when the photosensitive layer 11, along with the barrier means 14, is stripped from the positive image support layer 12, the layer 17 is visible as the border for the positive image. This layer can be white or any other color desired.

Throughout the above specification, there have been references in many cases to the final positive image which has a clear, white border. It should be understood that the color white should not be construed as a limitation upon the present invention. In fact, this border can be of any color desirable. For instance, the image-receiving layer 13 of Fig. 1 could be transparent. In this case, the image support layer 12 could be of any suitable color, such as green, blue, yellow or any other color having the requisite aesthetic and sales appeal.

In the various figures of the drawings the components of the photographic material of the present invention are shown as separate, distinct, and relatively thick layers. It should be understood that the relative thicknesses of these layers are shown only for illustrative purposes to clarify the invention. In actual practice some of these layers are extremely thin, even to the point of being difficult to measure with the naked eye.

Since certain changes may be made in the above product and process, and different embodiments of the invention could be made without departing from the scope thereof, it is intended that all matter contained in the above description or shown in the accompanying drawings shall be interpreted as illustrative and not in a limiting sense.

What is claimed is:

1. A photographic product comprising a first liquid-confining layer, including a photosensitive silver halide portion adjacent a surface thereof and capable of having a latent image formed therein upon photoexposure, a second liquid-confining layer which has an image-carrying surface for a transfer image and which is adapted to be positioned in superposed relation to said first liquid-confining layer with said image-carrying surface thereof facing said photosensitive portion of said first liquid-confining layer, a rupturable container holding a liquid, and a framing mask secured to that surface of one of said liquid-confining layers which is adapted to face the other liquid-confining layer when both said liquid-confining layers are superposed with respect to each other, said framing mask bounding an area, on that liquid-confining layer to which said mask is secured, that is smaller than the area of said photosensitive portion, said liquid-confining layers and container being attached together to permit said liquid-confining layers to be superposed with said mask therebetween and with said container positioned for releasing said liquid between said liquid-confining layers for spreading between and in contact with said framing mask and both of said layers, said framing mask being arranged to inhibit permeation by said liquid of border portions of that liquid-confining layer to which said mask is secured, said product having positioned therein photographic processing material, including a silver halide developer, transportable by said liquid to said photosensitive portion, said material being capable of developing a latent image in said photosensitive portion and, as a result of such development, causing differential disposition throughout the photosensitive layer of a substance for providing the image-carrying surface of said second liquid-confining layer with said transfer image, and said liquid upon permeation of said photosensitive portion rendering said material effective to develop said latent image and to form said transfer image on said image-carrying surface.

2. The product of claim 1 wherein said framing mask is secured to said first liquid-confining layer over the surface thereof, including the photosensitive portion, which is adapted to face the second liquid-confining layer.

3. The product of claim 1 wherein said framing mask is secured to the image-carrying surface of said second liquid-confining layer.

4. A photographic product comprising a first liquid-confining layer, including a photosensitive silver halide portion capable of having a latent image formed therein upon photoexposure, a second liquid-confining layer adapted to provide an image-carrying surface for a transfer image, a rupturable container holding a viscous liquid, said liquid including a film-forming colloid capable of forming a solid film upon drying, and a strippable framing mask separately secured to said image-carrying surface, said framing mask bounding an area on said image-carrying surface that is smaller than the area of said photosensitive portion, said layers and container being attached together to permit said layers to be superposed with said mask therebetween and with said container positioned for releasing said viscous liquid between said layers for spreading in a film over and in contact with the adjacent surfaces of said liquid-confining layers, including said framing mask, said framing mask being arranged so that border portions of said spread film are confined between said framing mask and said photosensitive portion, said product having positioned therein photographic processing material, including a silver halide developer, transportable by said liquid to said photosensitive portion, said material being capable of developing a latent image in said photosensitive portion and, as a result of such development, causing differential disposition throughout the photosensitive layer of a substance for providing the image-carrying surface of said second liquid-confining layer with said transfer image, and said liquid upon permeation of said photosensitive layer rendering said material effective to develop said latent image and to form said transfer image on said image-carrying surface, said framing mask being strippable from said image-carrying surface to achieve separation of said confined portions of the spread film from the remainder thereof.

5. The product of claim 4 wherein said framing mask is secured to said image-carrying surface by a sealing material which is substantially impermeable to said liquid.

6. The product of claim 4 wherein said image-carrying surface includes a recess in which said framing mask is positioned.

7. The product of claim 4 wherein said image-carrying surface includes a recess in which said framing mask is positioned and a coating is provided over said surface and said recessed framing mask to provide a smooth surface thereacross.

8. The product of claim 4 wherein said framing mask has inner edges which are tapered inwardly.

9. The product of claim 4 wherein said framing mask is built up of several layers of material, said layers being of decreasing width to provide a step-taper to edges of said framing mask defining a central opening therein.

10. The product of claim 4 wherein border portions of said image-carrying surface of said second liquid-confining layer are more adherent to a solid film of said film-forming colloid than intermediate portions of said image-carrying surface.

11. A photographic product containing all of the material, including a silver halide developer and a silver halide solvent and in the amount required to develop a latent image and produce a transfer image in said product, said product comprising a first liquid-confining layer, including a photosensitive silver halide portion capable of having a latent image formed therein upon photoexposure, a second liquid-confining layer which has an image-carrying surface for receiving said transfer image, a rupturable container holding a viscous liquid, said liquid including a film-forming colloid capable of forming a solid film upon drying, said second layer comprising two sheets separably secured together in superposed relation, one of said two sheets comprising a framing mask, said sheet which comprises said framing mask bounding an area on the other sheet which is smaller than the area of said photosensitive portion, said layers and container being attached together to permit said layers to be superposed with said framing mask facing said photosensitive portion and with said container positioned for releasing said viscous liquid between said layers for spreading in a film between and in contact with the adjacent superposed surfaces of said liquid-confining layers including said framing mask and said photosensitive portion so that border portions of said spread film are confined between said framing mask and said photosensitive portion, said liquid upon permeation of said photosensitive layer rendering said material effective to develop said latent image and to form said transfer image on said image-carrying surface, separation of said two sheets being operative to achieve separation of border portions of said transfer image from the remainder thereof.

12. A product containing a silver halide developer and capable of developing a photosensitive silver halide element, said product comprising an elongated rupturable container holding a liquid processing composition comprising an organic film-forming colloid, and a sheet support upon which said container is mounted, portions of the container walls being secured together in face to face relation to provide a liquid-dispensing lip extending substantially the length of the container, said sheet support having an elongated spreading surface extending longitudinally of said support from a location adjacent the spreading lip of said container and which is at least as wide as the length of said lip, the contents of said container being spreadable from said dispensing lip over said surface, a framing mask secured to the surface of said sheet support which carries said container, said framing mask covering at least border portions of said spreading surface whereby contact of said liquid with said spreading surface is restricted to an area lying within said border portions, said liquid being sufficient in amount to be spread in a film over said surface and to cover said surface and the mask thereon with a solid film of said organic colloid, said framing mask being strippable from said sheet support to achieve separation of border portions of said spread film from the remainder thereof, the silver halide developer in said product being rendered effective in said area upon the spreading of said liquid.

13. A photographic product comprising a rupturable container holding a viscous liquid which is capable of forming a solid film upon drying, a sheet support upon which said container is mounted, said sheet support providing a spreading surface which has an area which is substantially greater than the area of said container and which extends from said container and onto which said liquid is spreadable directly from said container, and a framing mask secured to said spreading surface of said sheet support and providing means covering a portion of said support for preventing contact by said liquid of border portions of said spreading surface of the sheet support, whereby border portions of said spread film will overlie said framing mask, the liquid in the container being sufficient in amount to cover said spreading surface, including said framing mask, said product containing at least one photographic processing agent from the class consisting of the silver halide developers and the silver halide fixing solvents, said processing agent being in an amount sufficient to process an image in an area of a photosensitive silver halide emulsion equivalent to the area of said spreading surface confined within said mask, the container contents, when spread on said sheet support, placing said processing agent in condition to effect the processing of said element, said framing mask being strippable from said spreading surface to achieve separation of said border portions of said spread film from the remainder thereof.

14. A photographic process of treating an exposed photosensitive layer having a photosensitive silver halide portion containing a latent negative image to obtain therefrom a positive image of the subject matter of said latent negative image, which process comprises bringing into superposed relation said photosensitive layer and an image-receiving layer with the emulsion side of said photosensitive layer facing said image-receiving layer and permeating a liquid, comprising a silver halide developer and a silver halide solvent, capable of developing exposed silver halide and of forming soluble silver complexes with unexposed silver halide, into one of said layers over a predetermined area of that surface thereof which faces the other of said layers while restricting penetration of said liquid into said other layer to a second area on that surface thereof which faces said one layer and which lies within the borders of said other layer and is smaller in size than said photosensitive portion by holding against the second-mentioned surface a substantially liquid-impervious framing mask provided with an aperture therein having an area substantially equal to said second area and located with respect to said second-mentioned surface so as to define said second area, developing said negative image and forming silver complexes from unexposed silver halide, transferring silver complexes from that part of said photosensitive layer which is in superposed relation to the aperture of said mask through said aperture and onto said image-receiving layer over an area thereof that is in superposed and registered relation to said mask aperture, converting transferred complexes to silver to provide said positive image, and separating said photosensitive layer and said framing mask from said image-receiving layer.

15. A photographic process as defined in claim 14 wherein said framing mask is in contact with said image-receiving layer and said liquid is applied between said mask and said photosensitive layer.

16. A photographic process as defined in claim 14 wherein said mask is in contact with said photosensitive layer and said liquid is applied between said mask and said image-receiving layer.

EDWIN H. LAND.

REFERENCES CITED

The following references are of record in the file of this patent:

UNITED STATES PATENTS

| Number | Name | Date |
|---|---|---|
| 917,310 | Kelley et al. | Apr. 6, 1909 |
| 1,232,796 | Hardenbrook | July 10, 1917 |
| 1,751,882 | Pifer | Mar. 25, 1930 |
| 2,178,771 | Alink | Nov. 7, 1939 |
| 2,209,087 | Leuch | July 23, 1940 |
| 2,322,005 | Fierke | June 15, 1943 |
| 2,322,006 | Fierke | June 15, 1943 |
| 2,322,027 | Jelley | June 15, 1943 |
| 2,352,014 | Rott | June 20, 1944 |
| 2,500,421 | Land | Mar. 14, 1950 |
| 2,543,181 | Land | Feb. 27, 1951 |

FOREIGN PATENTS

| Number | Country | Date |
|---|---|---|
| 30,337 | Switzerland | Feb. 1, 1904 |
| 369,146 | Germany | Feb. 15, 1921 |
| 370,821 | Germany | May 25, 1921 |
| 427,962 | Great Britain | Apr. 29, 1935 |
| 879,995 | France | Mar. 5, 1942 |